(12) United States Patent
Miyashita et al.

(10) Patent No.: US 6,280,600 B1
(45) Date of Patent: Aug. 28, 2001

(54) METHOD OF DECOMPOSING ORGANIC COMPOUNDS

(75) Inventors: Kohichi Miyashita; Keiji Nagano; Go Muto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/343,405

(22) Filed: Jun. 30, 1999

(30) Foreign Application Priority Data

Jul. 1, 1998 (JP) .................................................. 10-186270

(51) Int. Cl.$^7$ ...................................................... C02F 1/461
(52) U.S. Cl. ........................... 205/688; 205/746; 205/466
(58) Field of Search .................................. 205/688, 746, 205/466

(56) References Cited

U.S. PATENT DOCUMENTS

| | | | | |
|---|---|---|---|---|
| 3,764,499 | * | 10/1973 | Okubo et al. | 205/746 |
| 5,702,587 | * | 12/1997 | Clifford et al. | 205/760 |
| 5,997,717 | * | 12/1999 | Miyashita et al. | 205/746 |

FOREIGN PATENT DOCUMENTS

| | | |
|---|---|---|
| 34 28 582 A1 | 3/1985 | (DE) . |
| 43 30 518 A1 | 3/1995 | (DE) . |
| 0 841 305 A2 | 5/1998 | (EP) . |

OTHER PUBLICATIONS

Patent Abstracts of Japan, vol. 1996, No. 611, Nov. 29, 1996 & JP 08–192158A, Jul. 30, 1996.

International Publication WO 98/09917, Mar. 12, 1998, with brief English abstract.

* cited by examiner

Primary Examiner—Arun S. Phasge
(74) Attorney, Agent, or Firm—Arent Fox Kintner Plotkin & Kahn, PLLC

(57) ABSTRACT

A first electrolytic chamber which houses an anode plate and a cathode plate with an ion-permeable membrane interposed therebetween is supplied with raw water containing an electrolyte as chloride ions. The raw water is electrolyzed to obtain electrolyzed water at a cathode side in the first electrolytic chamber. The electrolyzed water is then electrolyzed at an anode side in a second electrolytic chamber which houses an anode plate and a cathode plate with an ion-permeable membrane interposed therebetween, for thereby generating hydroxyl radicals in the electrolyzed water. The electrolyzed water containing the hydroxyl radicals is added to water containing an organic substance to cause the hydroxyl radicals to attack to the organic substance for thereby decomposing the organic substance.

10 Claims, 10 Drawing Sheets

METHOD OF DECOMPOSING ORGANIC COMPOUNDS

BACKGROUND OF THE INVENTION

1. Field of the Invention

The present invention relates to a method of decomposing composing an organic chemical such as a phenol contained in water.

2. Description of the Related Art

It has been reported in recent years that certain organic chemicals, e.g., p-tertiary butyl phenol, bisphenol A, etc. act as endocrine-disrupting chemicals. These endocrine disrupters are known as being related to serious human and animal health problems and as having special undesirable effects on the environment.

There have heretofore been available various processes of decomposing or removing organic chemicals contained in water. These processes include an adsorption process using activated carbon or the like, an ultrafiltration process, and a distillation process. Another process which has recently attracted attention in the art employs a photocatalyst of titanium oxide.

The adsorption process is disadvantageous in that it can remove only a limited range of organic chemicals. The ultrafiltration process fails to separate low-molecular-weight compounds from water because they pass together with water through the ultrafiltration membrane, though the process is capable of removing high-molecular-weight compounds from water. The distillation process is effective to remove organic substances from water to a certain extent because it relies upon different boiling points thereof. However, the distillation process cannot remove those organic substances completely from water, and requires a great amount of energy as it heats water that contains organic substances. Although the recent process which employs the titanium oxide photocatalyst is able to decompose almost all organic substances with the strong oxidizing power of the photocatalyst, the process fails to process a large quantity of organic substances because it requires irradiation with ultraviolet light.

Consequently, it has been desired in the art to develop a process of easily decomposing organic substances such as endocrine disrupters.

SUMMARY OF THE INVENTION

It is therefore an object of the present invention to provide a method of easily decomposing organic substances contained in water.

Generally, it is known that hydroxyl radicals (.OH) have a strong oxidizing ability and a strong sterilizing ability. For example, it has been reported that many organic substances are oxidized by hydroxyl radicals which are formed on the surface of a titanium oxide photocatalyst upon exposure to light. The hydroxyl radicals have a very short lifetime, generally in microseconds.

The inventor has proposed a method of producing electrolyzed water containing hydrogen peroxide by supplying a first electrolytic chamber which houses an anode plate and a cathode plate with an ion-permeable membrane interposed therebetween, with raw water containing an electrolyte as chloride ions, electrolyzing the raw water, and electrolyzing only electrolyzed water obtained at the cathode side in the first electrolytic chamber, at an anode side in a second electrolytic chamber which houses an anode plate and a cathode plate with an ion-permeable membrane interposed therebetween. For details, reference should be made to Japanese patent application No. 9-271245. The inventor has studied the electrolyzed water produced by the above method, and found that the electrolyzed water produces hydroxyl radicals successively, so that the hydroxyl radicals have an apparent long lifetime. The inventor has completed the present invention based on the above finding.

According to a first aspect of the present invention, there is provided a method of decomposing an organic substance, comprising the steps of supplying a first electrolytic chamber which houses an anode plate and a cathode plate with an ion-permeable membrane interposed therebetween, with raw water containing an electrolyte as chloride ions, electrolyzing the raw water, electrolyzing only electrolyzed water obtained at a cathode side in the first electrolytic chamber, at an anode side in a second electrolytic chamber which houses an anode plate and a cathode plate with an ion-permeable membrane interposed therebetween, for thereby generating hydroxyl radicals in the electrolyzed water, adding the electrolyzed water containing the hydroxyl radicals to water containing an organic substance to cause the hydroxyl radicals to attack to the organic substance for thereby decomposing the organic substance.

According to the first aspect, the raw water containing the electrolyte is supplied to the first electrolytic chamber and then electrolyzed. Thereafter, only the electrolyzed water obtained from the cathode side in the first electrolytic chamber is electrolyzed at the anode side in the second electrolytic chamber which is identical in structure to the first electrolytic chamber, for thereby obtaining electrolyzed water containing hydroxyl radicals. Though hydroxyl radicals have a short lifetime as microseconds, since hydroxyl radicals are produced successively by the method according to the first aspect, the hydroxyl radicals have an apparent long lifetime of several hours after the electrolyzed water is produced.

The electrolyzed water containing the hydroxyl radicals is then added to water containing an organic substance. The hydroxyl radicals attack to the organic substance for thereby decomposing the organic substance with a strong oxidizing capability of the hydroxyl radicals.

According to a second aspect of the present invention, there is provided a method of decomposing an organic substance, comprising the steps of preparing raw water by adding an electrolyte as chloride ions to water containing an organic substance, supplying the raw water to a first electrolytic chamber which houses an anode plate and a cathode plate with an ion-permeable membrane interposed therebetween, electrolyzing the raw water, electrolyzing only electrolyzed water obtained at a cathode side in said first electrolytic chamber, at an anode side in a second electrolytic chamber which houses an anode plate and a cathode plate with an ion-permeable membrane interposed therebetween, for thereby generating hydroxyl radicals in the electrolyzed water, and causing the hydroxyl radicals to attack to the organic substance contained in the raw water for thereby decomposing the organic substance.

According to the second aspect, raw water is prepared by adding the electrolyte to water containing an organic substance, rather than adding electrolyzed water containing the hydroxyl radicals to water containing an organic substance. The raw water is supplied to the first electrolytic chamber and then electrolyzed. Thereafter, only the electrolyzed water obtained from the cathode side in the first electrolytic chamber is electrolyzed at the anode side in the second electrolytic chamber which is identical in structure to the first electrolytic chamber. Hydroxyl radicals are produced in the second electrolytic chamber, these radicals attack to the organic substance contained in the raw water, at the same time, an electro-chemical reaction of the organic substance occurs in an electrode surface, various of reaction carried out in the system. As a result, the organic substance is decomposed.

In each of the above aspects of the present invention, since the chloride is used as the electrolyte, when the raw water containing the electrolyte is electrolyzed, oxygen, hydrogen peroxide, hydroxyl radicals, chlorine, and hypochlorous acid are generated at the anode side in the second electrolytic chamber. It is presumed that of these substances, hydrogen peroxide and chlorine, or hypochlorous acid is involved in the successive production of the hydroxyl radicals.

The chloride may be sodium chloride (NaCl) or potassium chloride (KCl), for example.

The methods according to the above aspects of the present invention are effective to decompose an aromatic compound, which is generally known as not being easily decomposable. For example, the methods are capable of decomposing a phenol shown by the following formula (1):

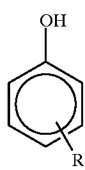
(1)

In the formula (1), R may be a group which can be replaced with hydrogen, regardless of whether it is inorganic or organic.

Generally, the phenols shown by the above formula (1) may be p-tertiary butyl phenol shown by the formula (2), bisphenol A shown by the formula (3), or some of decomposed products thereof. It has been suspected that p-tertiary butyl phenol and bisphenol A are endocrine disrupters.

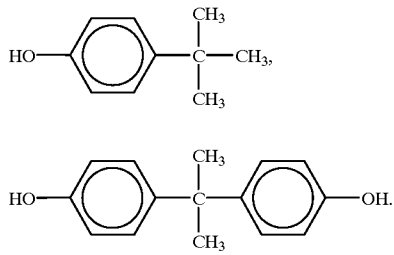
(2)

(3)

The above compound has an aliphatic component in the molecule, e.g., $-C(CH_3)_3$ in the formula (2) or $>C(CH_3)_2$ in the formula (3). The methods according to the above aspects of the present invention decompose and remove the organic substance including the aliphatic component. Therefore, the methods according to the above aspects of the present invention are effective to decompose aliphatic compounds such as amines shown by the formulas (4) to (6) shown below and an aldehyde shown by the formula (7) shown below.

$R-NH_2$ (4)

$R_2-NH$ (5)

$R_3-N$ (6)

$R-CHO$ (7)

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
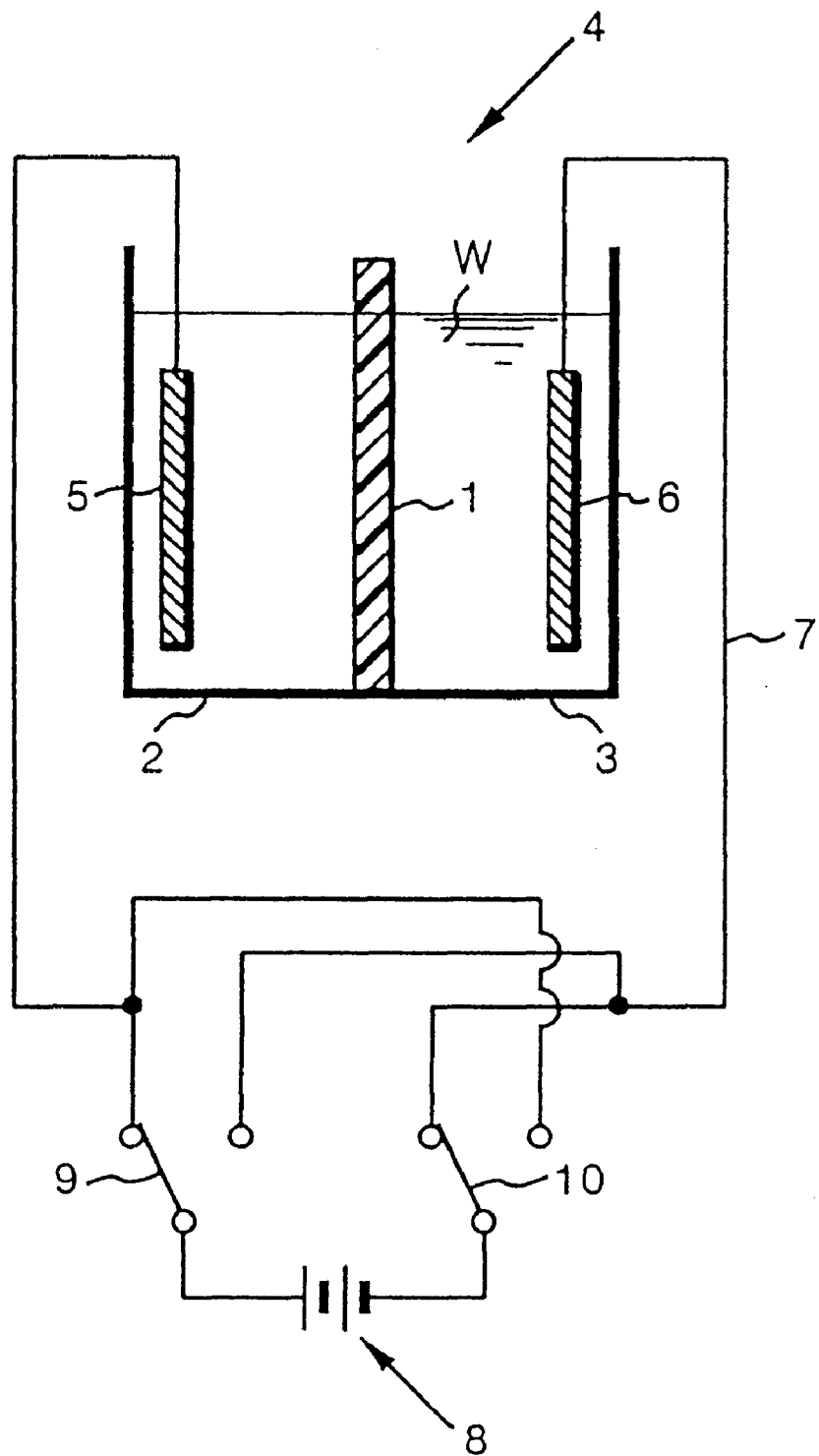
FIG. 1 is a circuit diagram, partly in cross section, of an equipment which is used to carry out a method of decomposing and removing organic substances according to the present invention.

FIG. 1 shows an equipment which is used to carry out a method of decomposing and removing organic substances according to the present invention. As shown in FIG. 1, the equipment has an electrolytic cell 4 having a pair of chambers 2, 3 separated from each other by an ion-permeable membrane 1 interposed therebetween. The chambers 2, 3 accommodate electrode plates 5, 6 respectively therein, each of the electrode plates 5, 6 composing with titanium mesh as base material and put platinum on it for electrochemical catalyst. The electrode plates 5, 6 are electrically connected to an external power supply 8 by an external circuit 7. The external circuit 7 has switches 9, 10 which are connected to the electrode plates 5, 6 and the external power supply 8 so as to be able to change the polarities of the electrode plates 5, 6.

The ion-permeable membrane 1 may be made of woven fabric, non-woven fabric, plastic film (polymer film), or the like. For example, the ion-permeable membrane 1 may be made of "Nafion 117" (commercial name) that is a cation exchange membrane manufactured by DuPont, or "U-pore" (trademark) that is a porous film of polyolefin manufactured by Ube Industries, Ltd.

The equipment shown in FIG. 1 operates as follows: The switches 9, 10 are operated to connect the electrode plates 5, 6 to the external power supply 8 such that the electrode plate 5 will act as an anode and the electrode plate 6 as a cathode. The chambers 2, 3 are supplied with raw water W containing a chloride such as sodium chloride or potassium chloride as an electrolyte. A voltage is applied between the electrode plates 5, 6 to carry out a first electrolyzing stage. Then, the switches 9, 10 are turned over to reverse the polarity of the current supplied to the electrode plates 5, 6 such that the electrode plate 5 will be a cathode and the electrode plate 6 as an anode, for thereby carrying out a second electrolyzing stage. As a result, only electrolyzed water obtained at the cathode side in the first electrolyzing stage is electrolyzed at the anode side in the second electrolyzing stage.

During the first electrolyzing stage, in the chamber 3 as the cathode side, the water is electrolyzed to produce hydrogen and hydroxide ions ($OH^-$). The reaction in the chamber 3 is indicated by the following equation (8):

$$2H_2O + 2e^- \rightarrow 2OH^- + H_2 \quad (8)$$

The electrolyzed water containing hydroxide ions was produced at the cathode side in the first electrolyzing stage. When the second electrolyzing stage is carried out by reversing the polarity of the current charged to the electrode plates 5, 6 such that the electrode plate 5 will be a cathode and the electrode plate 6 as an anode, oxygen is produced by the electrolysis of the water in the chamber 3 as the anode side in the second electrolyzing stage, and hydrogen peroxide ($H_2O_2$) and oxygen are generated from the hydroxide ions. The reaction in the chamber 3 is shown by the following equations (9) to (12):

$$H_2O \rightarrow (1/2)O^2 + 2H^+ + 2e^- \quad (9)$$

$$2OH^- \rightarrow H^2O^2 + 2e^- \quad (10)$$

$$2OH^- \rightarrow H^2O^2 + (1/2)O^2 + 2e^- \quad (11)$$

$$2Cl^- \rightarrow Cl_2 + 2e^- \quad (12)$$

As a result, electrolyzed water containing hydrogen peroxide which is used in the present invention is obtained from the chamber 3 as the anode side in the second electrolyzing stage. The electrolyzed water contains hydroxyl radicals (.OH) and hydrogen peroxide.

In the electrolyzed water obtained from the chamber 3 as the anode side in the second electrolyzing stage, it is considered that the hydroxyl radicals are generated from hydroxide ions, water, and hydrogen peroxide. The reaction that can be presumed is shown by the following equations (13) to (15):

$$OH^- \rightarrow e^- + .OH \quad (13)$$

$$H_2O \rightarrow H^+ + e^- + .OH \quad (14)$$

$$H_2O_2 + H^+ + e^- \rightarrow H_2O + .OH \quad (15)$$

Generally, radicals such as hydroxyl radicals have a short lifetime, and it cannot be easy to detect their existence. However, unstable radicals as the OH radicals can be trapped for chemical reaction, therefore, it is detected by a spin trapping method based on ESR. As a result, spectrum pattern of the product (electrolyzed water) compared with the known ESR spectrum of hydroxyl radicals (.OH), the hydroxyl radicals in the electrolyzed water can easily be confirmed. The known ESR spectrum is described in various literatures, for example, "Easily understandable basic knowledge of electrolyzed water of strong acidity" edited by The Japanese Society for Bio/Chemo Dynamic Waters, published by Ohm-sha, page 46 (1997)(Written by Japanese).

In an inventive example, 2.3 liters of raw water W to which sodium chloride was added in such an amount that it would have a concentration of 0.8 g/liter were supplied to each of the chambers 2, 3 of the electrolytic cell 4. In the first electrolyzing stage, a voltage was applied between the electrode plates 5, 6 to electrolyze the raw water W with a constant current of 0.8 A for 25 minutes. In the second electrolyzing stage, the polarity of the current supplied to the electrode plates 5, 6 is reversed to electrolyze the raw water W with a constant current of 0.8 A for 25 minutes. As a result, electrolyzed water having a redox potential of 252 mV, pH 5.26, and a effective chlorine concentration of 5.0 ppm was obtained from the chamber 3 which was the anode side in the second electrolyzing stage.

Figure 2A:
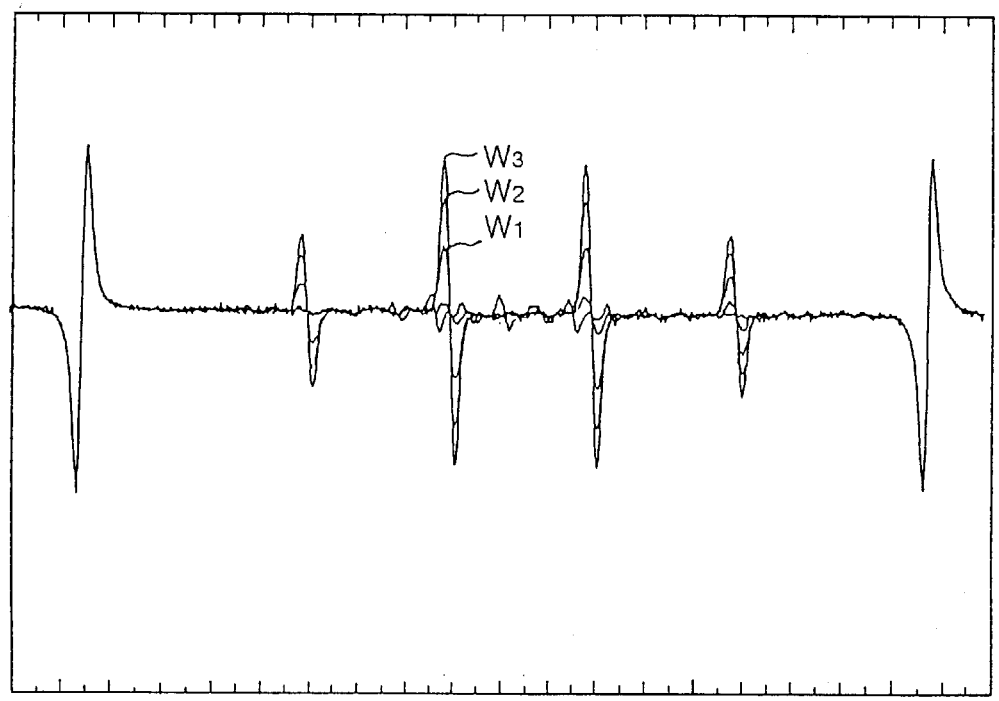
FIG. 2(a) is a showing an ESR (electron spin resonance) spectrum, measured with spin trapping method, of electrolyzed water containing hydroxyl radicals which is produced by the equipment shown in FIG. 1.
Figure 2B:
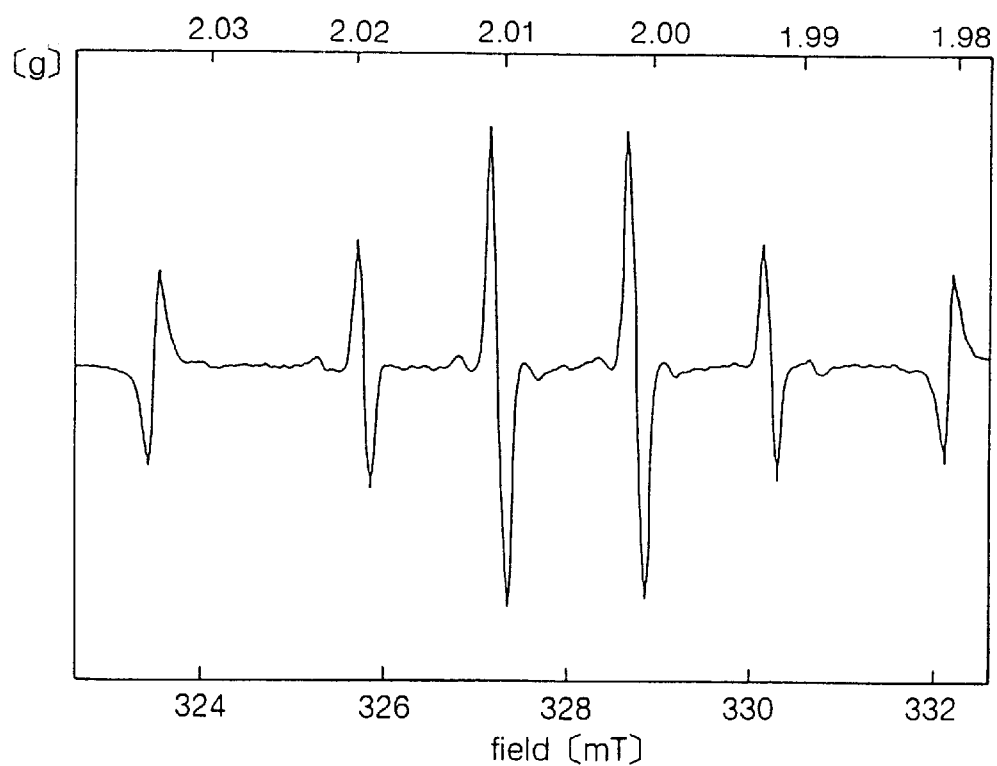
FIG. 2(b) is showing an ESR spectrum of water containing hydroxyl radicals for comparison.

An ESR spectrum of the electrolyzed water obtained from the chamber 3 which was the anode side in the second electrolyzing stage is shown in FIG. 2(a). The ESR spectrum shown in FIG. 2(a) was measured by the electrolyzed water which was produced after about 3 hours. Each of the scanning cycles took 3 minutes to perform, and was conducted such that it started following the end of a previous scanning cycle. It was observed from the ESR spectrum shown in FIG. 2(a) that the amplitude increased from $W_1$ to $W_2$ to $W_3$ through the repeated scanning cycles. FIG. 2(b) shows a known ESR spectrum of hydroxyl radicals described in the above literature.

A comparison of the ESR spectrum shown in FIG. 2(a) with the known ESR spectrum shown in FIG. 2(b) indicates that they are in good agreement with each other, confirming the existence of hydroxyl radicals in the electrolyze water. Though the hydroxyl radicals have a very short lifetime, generally in microseconds, it is presumed that the hydroxyl radicals increased because the intensity increased with time from $W_1$, $W_2$ to $W_3$ in the electrolyzed water obtained from the chamber 3 shown in FIG. 1.

In this phenomenon, the electrolyzed water obtained from the chamber 3 is added to water containing an organic substance to cause the hydroxyl radicals to attack to the organic substance for thereby decomposing the organic substance.

In case of the organic substance is an aromatic compound, the electrolyzed water obtained from the chamber 3 is added to water containing such an aromatic compound, and decompose the aromatic compound as described below. The aromatic compound is p-tertiary butyl phenol as shown by the above formula (2) or bisphenol A as shown by the above formula (3).

In the method according to the present embodiment, actually, the electrolyzed water is added to water containing an organic substance such as p-tertiary butyl phenol, bisphenol A, or the like. In the following examples, however, a certain amount of p-tertiary butyl phenol or bisphenol A was added to the electrolyzed water for experimental purposes.

Figure 3:
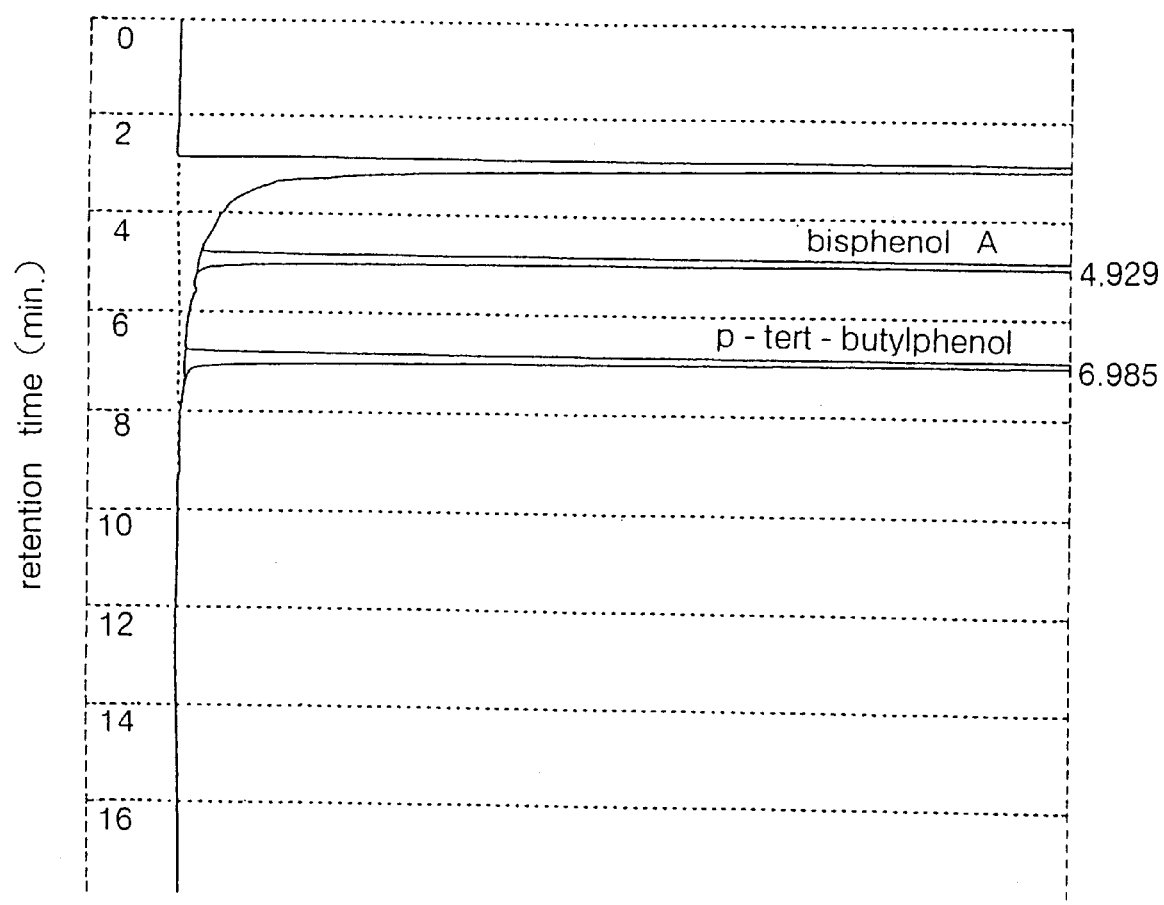
FIG. 3 is showing a comparative chromatogram, measured by HPLC (high performance liquid chromatography), of water containing bisphenol A and p-tertiary butyl phenol as aromatic compounds.

FIG. 3 shows a chromatogram of p-tertiary butyl phenol and bisphenol A in top water by HPLC. The concentration of these are 10 ppm each. The chromatogram shown in FIG. 3 was measured by a high-performance liquid chromatograph (type LC-6A) manufactured by Shimadzu Seisakusho Ltd., using a column (Intersil ODS-3 (250×4.6 mm I.D.)) manufactured by GL Science, under the conditions that the column temperature was 40° C., the mobile phase was a mixture of acetonitrile and water (the volume ratio was 3:1), the flow rate was 0.7 milliliter/minute, and the injected amount of the sample solution was 20 microliters. The separated substances were detected by an ultraviolet detector having a wavelength of 220 nm. Since the benzene ring has an absorption band in the ultraviolet region, if an aromatic compound is present in the sample solution, then it can be detected by the ultraviolet detector of the above wavelength.

A peak of bisphenol A is present at a retention time of 4.9 minutes and a peak of p-tertiary butyl phenol present at a retention time of 6.9 minutes in FIG. 3. A peak that is present at a retention time of 3 minutes in the chromatograph shown in FIG. 3 means inorganic salts contained in the tap water.

Figure 4:
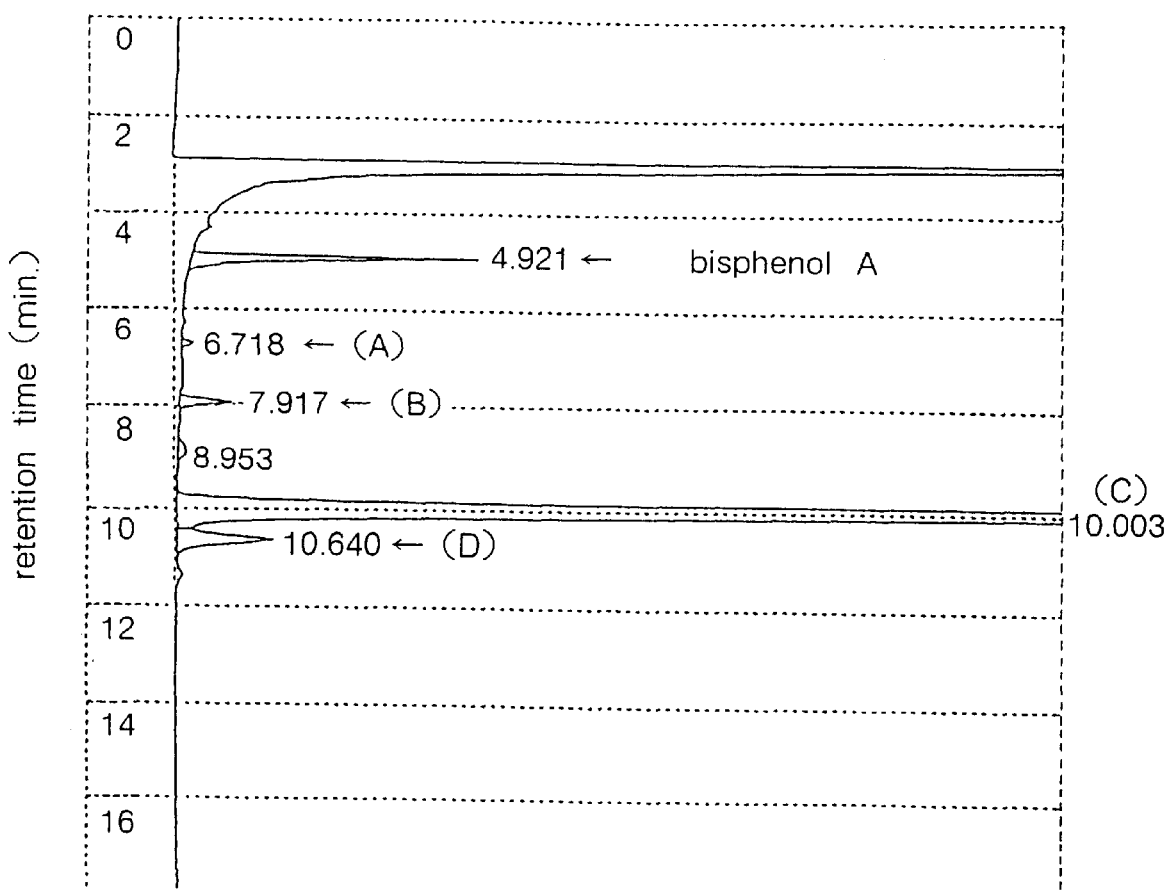
FIG. 4 is showing a HPLC chromatogram of bisphenol A in the electrolyzed water of which is produced by equipment shown in FIG. 1.

FIG. 4 shows a chromatogram, measured by HPLC, of a sample solution I that comprised electrolyzed water which was obtained from the chamber 3 shown in FIG. 1 and to which bisphenol A was added such that it would have a concentration of 10 ppm. The chromatogram shown in FIG. 3 was measured under exactly the same conditions as those of the chromatogram shown in FIG. 3.

It can be seen from FIG. 4 that a peak of bisphenol A is present at a retention time of 4.9 minutes, which is substantially the same as the retention time for the peak of bisphenol A in FIG. 3, and the intensity thereof is much lower than the peak of bisphenol A shown in FIG. 3. The lower intensity of bisphenol A appears to be result from the fact that the bisphenol A contained in the sample solution I was decomposed by hydroxyl radicals contained in the electrolyzed water. A peak that is present at a retention time of 3 minutes in the chromatograph shown in FIG. 4 means inorganic compound that is mainly a chlorine compound such as hypochlorous acid. Peaks (A), (B), (C), and (D) that are present respectively at retention times of 6.7, 7.9, 10.0, and 10.6 minutes appear to represent reaction products or decomposed products of bisphenol A.

Figure 5:
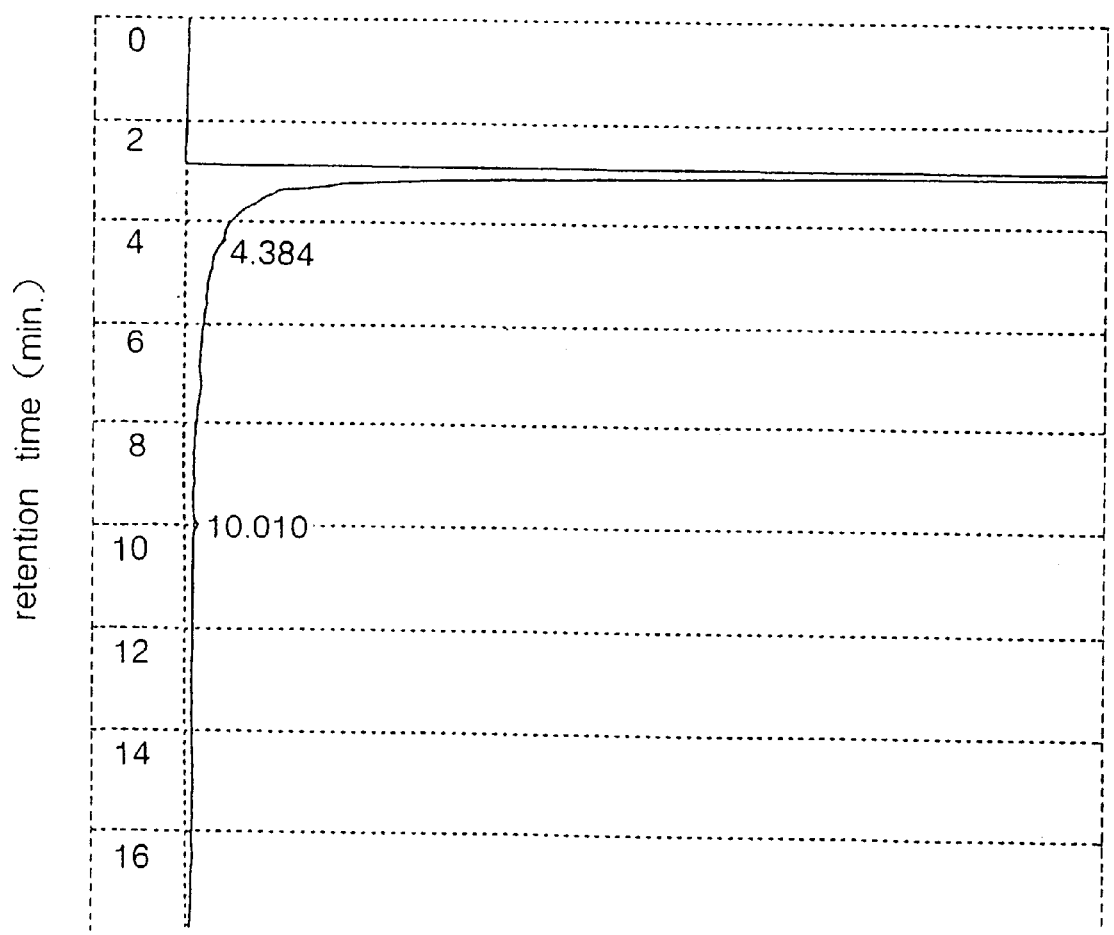
FIG. 5 is showing a HPLC chromatogram of decomposed reaction products of bisphenol A in the electrolyzed water of which is produced by equipment shown in FIG. 1.

FIG. 5 shows a chromatogram, measured by HPLC, of a sample solution II that was produced by diluting twice the sample solution I with electrolyzed water obtained from the chamber 3 shown in FIG. 1. The chromatogram shown in FIG. 5 was measured under exactly the same conditions as those of the chromatogram shown in FIG. 3. It can be understood from FIG. 5 that a very small peak of bisphenol A is present at a retention time of 4.384 minutes, which is substantially the same as the retention time for the peak of bisphenol A in FIG. 3, and that the chromatogram shown in FIG. 5 is completely free of the peaks (A)–(D) present in the chromatogram shown in FIG. 4. A peak that is present at a retention time of 3 minutes in the chromatograph shown in FIG. 5 means inorganic compound that is primarily a chlorine compound such as hypochlorous acid and or NaCl.

It is clear from FIGS. 4 and 5 that bisphenol A changed to the decomposed products (A)–(D) and then to compounds having no absorption band in the ultraviolet region due to the hydroxyl radicals contained in the electrolyzed water obtained from the chamber 3 shown in FIG. 1, and that no bisphenol A exists in the solution.

Figure 6:
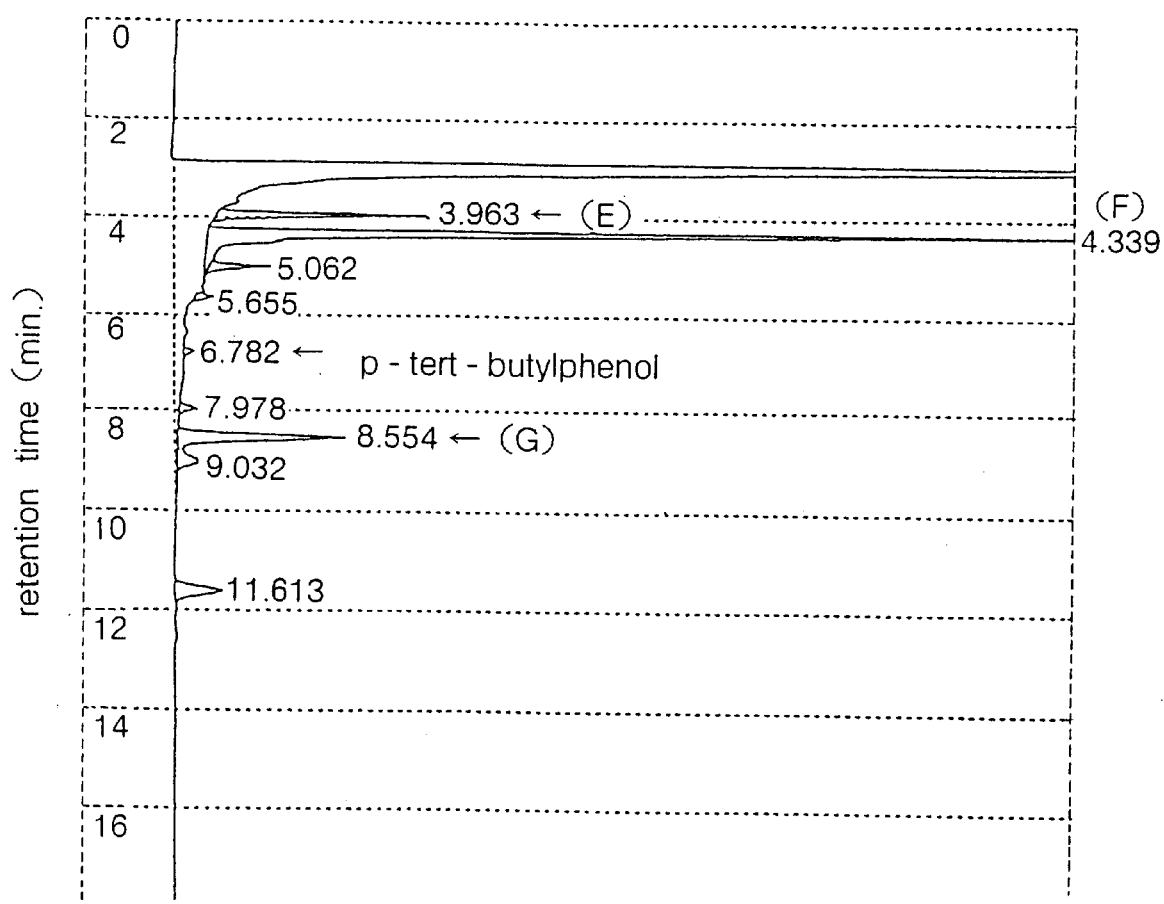
FIG. 6 is showing a HPLC chromatogram of p-tertiary butyl phenol in the electrolyzed water of which is produced by equipment shown in FIG. 1.

FIG. 6 shows a chromatogram, measured by HPLC, of a sample solution III that was produced by adding p-tertiary butyl phenol to electrolyzed water obtained from the chamber 3 such that the p-tertiary butyl phenol would have a concentration of 10 ppm. The chromatogram shown in FIG. 6 was measured under exactly the same conditions as those of the chromatogram shown in FIG. 3.

It can be seen from FIG. 6 that a peak of p-tertiary butyl phenol is present at a retention time of 6.7 minutes, which is substantially the same as the retention time for the peak of p-tertiary butyl phenol in FIG. 3, and the intensity thereof is much lower than the peak of p-tertiary butyl phenol shown in FIG. 3. The lower intensity of p-tertiary butyl phenol appears to result from the fact that the p-tertiary butyl phenol contained in the sample solution III was decomposed by hydroxyl radicals contained in the electrolyzed water obtained from the chamber 3. A peak that is present at a retention time of 3 minutes in the chromatograph shown in FIG. 6 means inorganic compound that is mainly a chlorine compound such as hypochlorous acid. Peaks (E), (F), and (G) that are present respectively at retention times of 3.9, 4.3, and 8.5 minutes appear to represent reaction products of p-tertiary butyl phenol.

Figure 7:
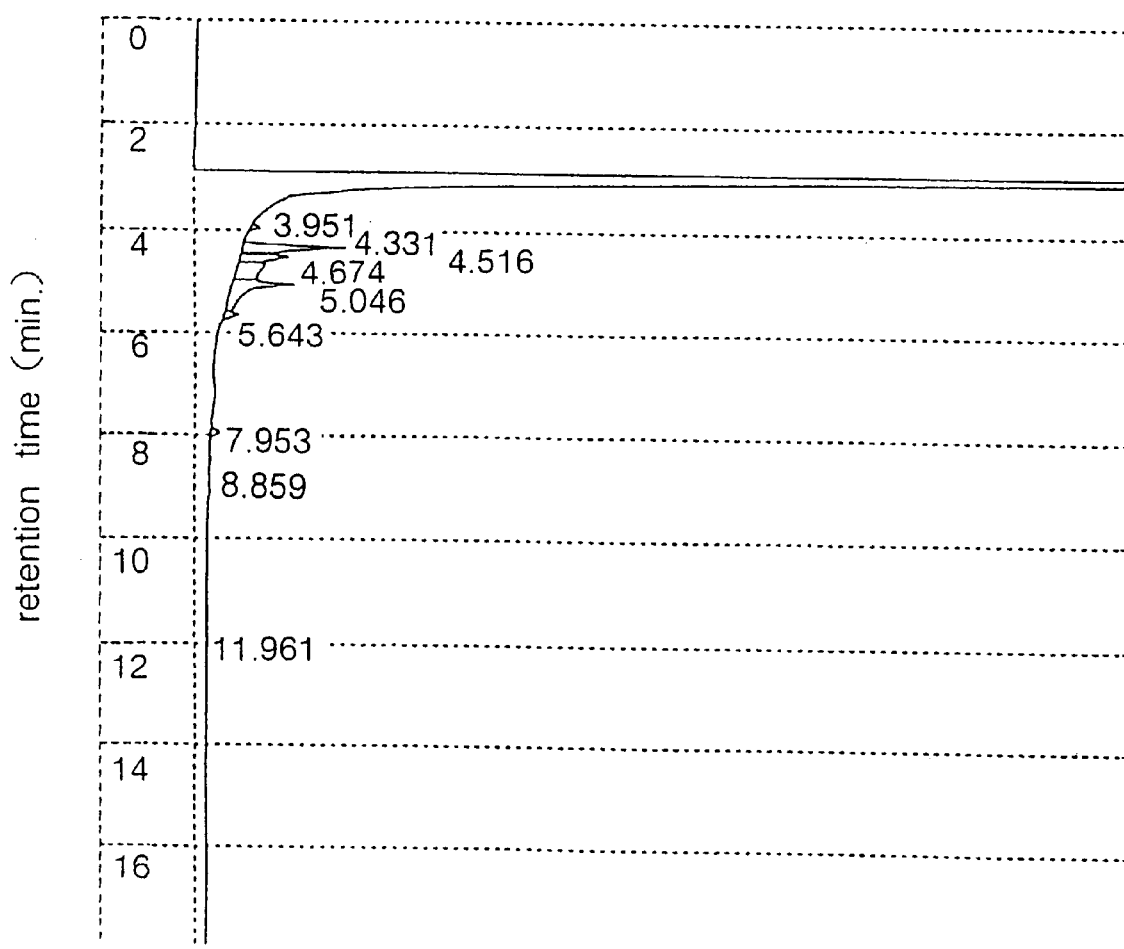
FIG. 7 is showing a HPLC chromatogram of decomposed reaction products of p-tertiary butyl phenol in the electrolyzed water of which is produced by equipment shown in FIG. 1.

FIG. 7 shows a chromatogram, measured by HPLC, of a sample solution IV that was produced by diluting twice the sample solution III with electrolyzed water obtained from the chamber 3 shown in FIG. 1. The chromatogram shown in FIG. 7 was measured under exactly the same conditions as those of the chromatogram shown in FIG. 3. It can be seen from FIG. 7 that almost no peak is present at the same position as the peak of p-tertiary butyl phenol in the chromatogram shown in FIG. 3, and hence no peak of p-tertiary butyl phenol is present in the chromatogram shown in FIG. 7. In FIG. 7, the peaks (E)–(G) present in the chromatogram shown in FIG. 6 are only slightly recognized. A peak that is present at a retention time of 3 minutes in the chromatograph shown in FIG. 7 means inorganic compound that is mainly a chlorine compound such as hypochlorous acid.

It is clear from FIGS. 6 and 7 that p-tertiary butyl phenol changed to the decomposed products (E)–(G) and then to compounds having no absorption band in the ultraviolet region due to the hydroxyl radicals contained in the electrolyzed water obtained from the chamber 3 shown in FIG. 1, and that p-tertiary butyl phenol is decomposed substantially completely.

In case of the organic substance is an aliphatic compound, then the electrolyzed water obtained from the chamber 3 is added to water containing such an aliphatic compound to decompose the aliphatic compound as described below. The aliphatic compound is n-butyl aldehyde as shown by the above formula (7) where R— is $CH_3CH_2CH_2CH_2$—, and it is used as a material of synthetic resins, a rubber vulcanization accelerator, etc.

In the method according to the present embodiment, actually, the electrolyzed water is added to water containing n-butyl aldehyde. In the following examples, however, a certain amount of n-butyl aldehyde was added to the electrolyzed water for experimental purposes.

Figure 8:
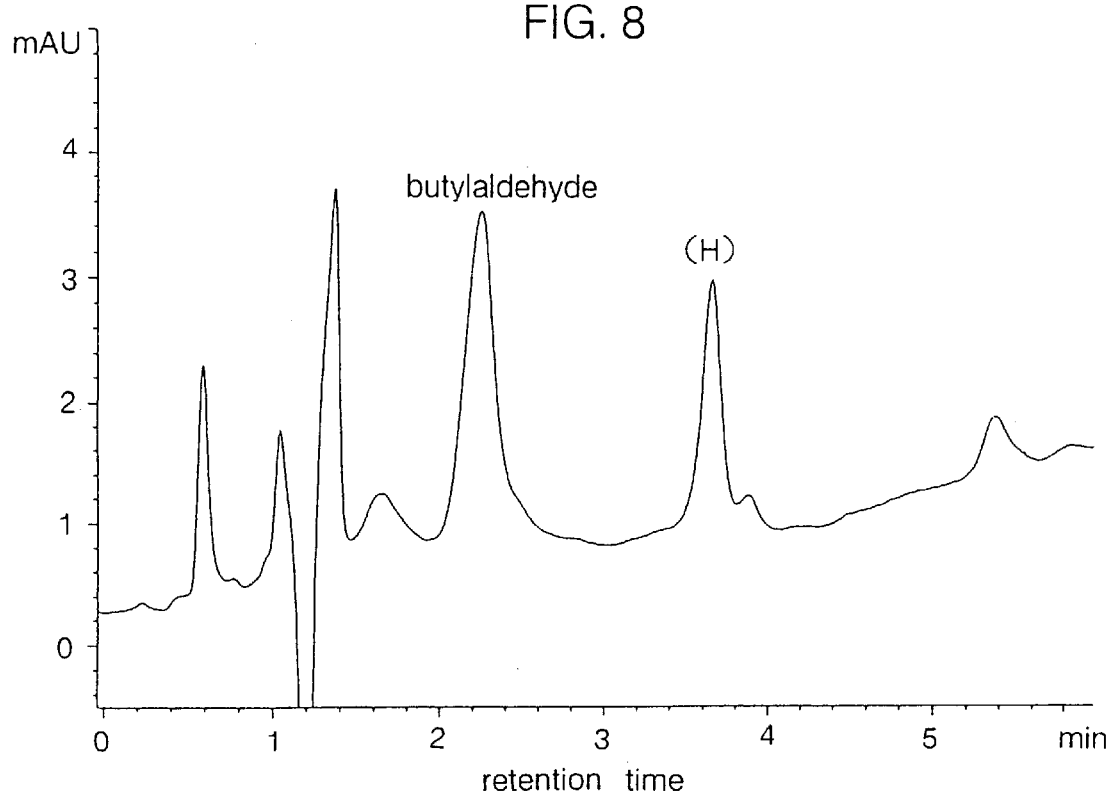
FIG. 8 is a diagram showing a comparative chromatogram, produced by HPLC, of water containing n-butyl aldehyde as an aliphatic compound.

FIG. 8 shows a comparative chromatogram, measured by HPLC, of an aqueous solution produced by diluting n-butyl aldehyde with distilled water such that it would be of 0.1 volume %. The chromatogram shown in FIG. 8 was measured by a high-performance liquid chromatograph (HP1100) manufactured by Hewlett-Packard, using a column (Hyporsil ODSC-3 (125×4 mm I.D.)) manufactured by Hewlett-Packard, under the conditions that the column temperature was 40° C., the mobile phase was a mixture of acetonitrile and water (the volume ratio was 3:7), the flow rate was 1.0 milliliter/minute, and the injected amount of the sample solution was 20 microliters. The substances separated by the high-performance liquid chromatograph were detected by a diode-array detector with an ultraviolet radiation having a wavelength of 200 nm. The separated substances were measured for spectrums in the wavelength range from 200 to 375 nm.

A study of the chromatogram shown in FIG. 8 shows that a peak of n-butyl aldehyde is present at a retention time of 2.2 minutes and a peak (H) of an impurity or a partially decomposed product of n-butyl aldehyde is present at a retention time of 3.7 minutes. The spectrum of n-butyl aldehyde is illustrated in FIG. 10(a), and the spectrum of the substance represented by the peak (H) is illustrated in FIG. 10(b).

Figure 9:
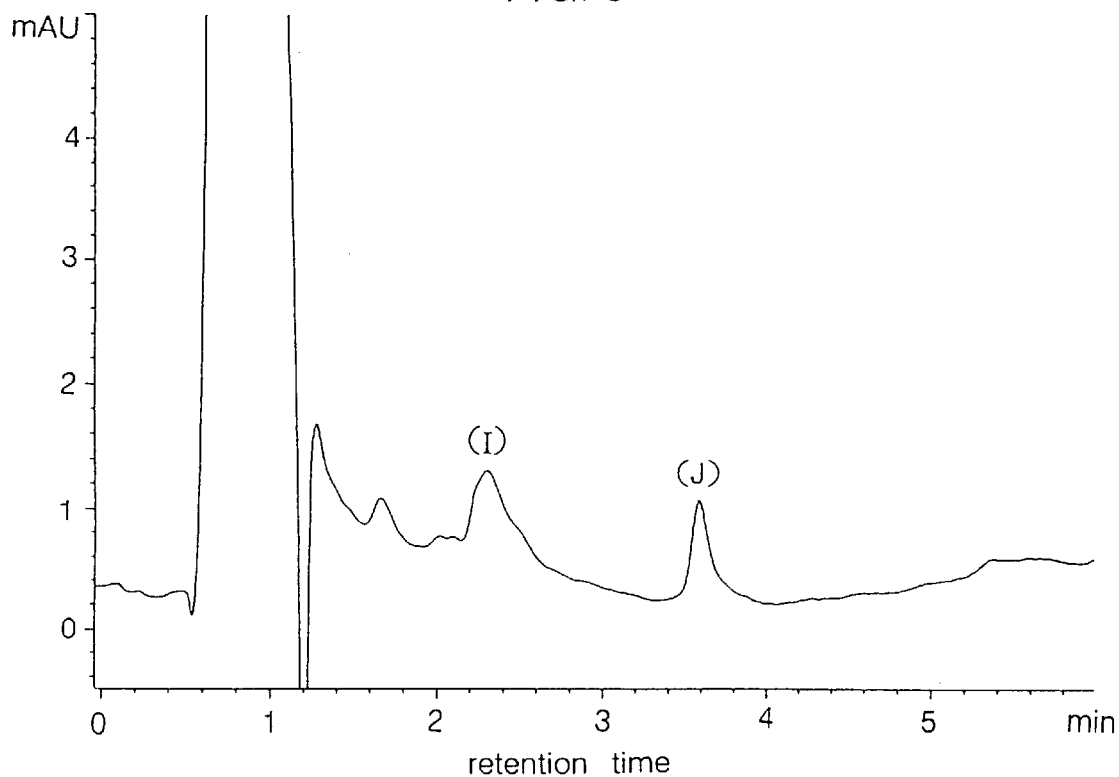
FIG. 9 is showing a HPLC chromatogram of decomposed reaction products of n-butyl aldehyde in the electrolyzed water of which is produced by equipment shown in FIG. 1.

FIG. 9 shows a chromatogram, measured by HPLC, of a sample solution V that comprised electrolyzed water which was obtained from the chamber 3 shown in FIG. 1 and to which an aqueous solution of 0.1 volume % of n-butyl aldehyde was added such that it would be of 0.002 volume %. The chromatogram shown in FIG. 9 was measured under exactly the same conditions as those of the chromatogram shown in FIG. 8.

It can be seen from FIG. 9 that two peaks (I), (J) are present in the chromatogram shown in FIG. 9 at substantially the same positions as the peak representing n-butyl aldehyde in FIG. 8 and the peak (H) representing the impurity or the partially decomposed product of n-butyl aldehyde in FIG. 8. The spectrum of the substance represented by the peak (I) is illustrated in FIG. 11(a), and the spectrum of the substance represented by the peak (J) is illustrated in FIG. 11(b).

Figure 10A:
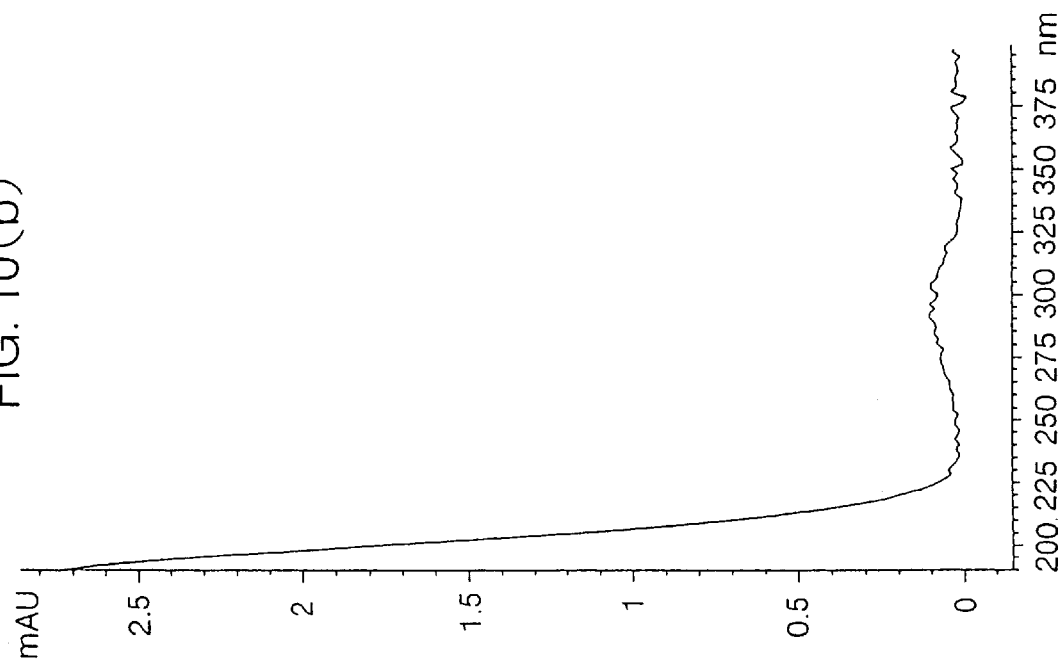
FIGS. 10(a) and 10(b) are showing spectra of major peaks of the HPLC chromatogram shown in FIG. 8.
Figure 10B:
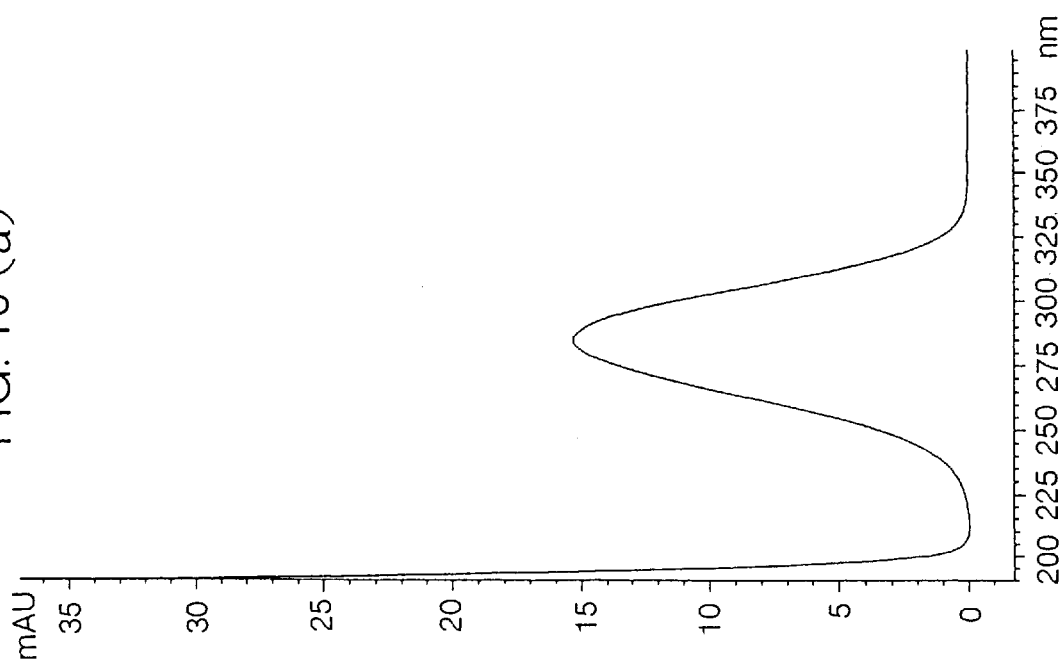
Figure 11A:
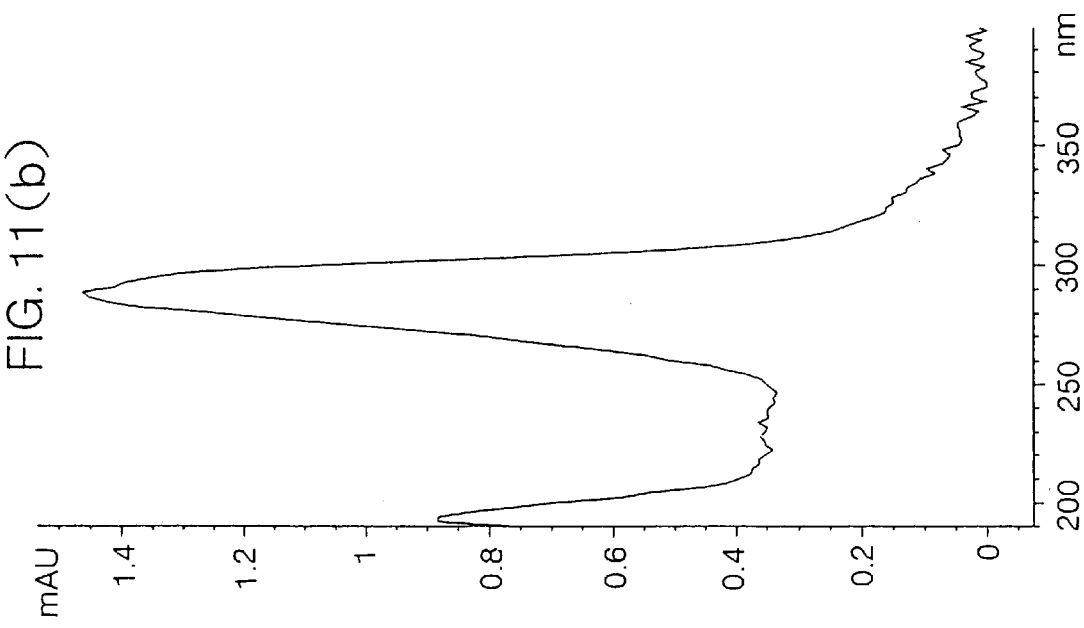
FIGS. 11(a) and 11(b) are showing spectra of major peaks of the HPLC chromatogram shown in FIG. 9.
Figure 11B:
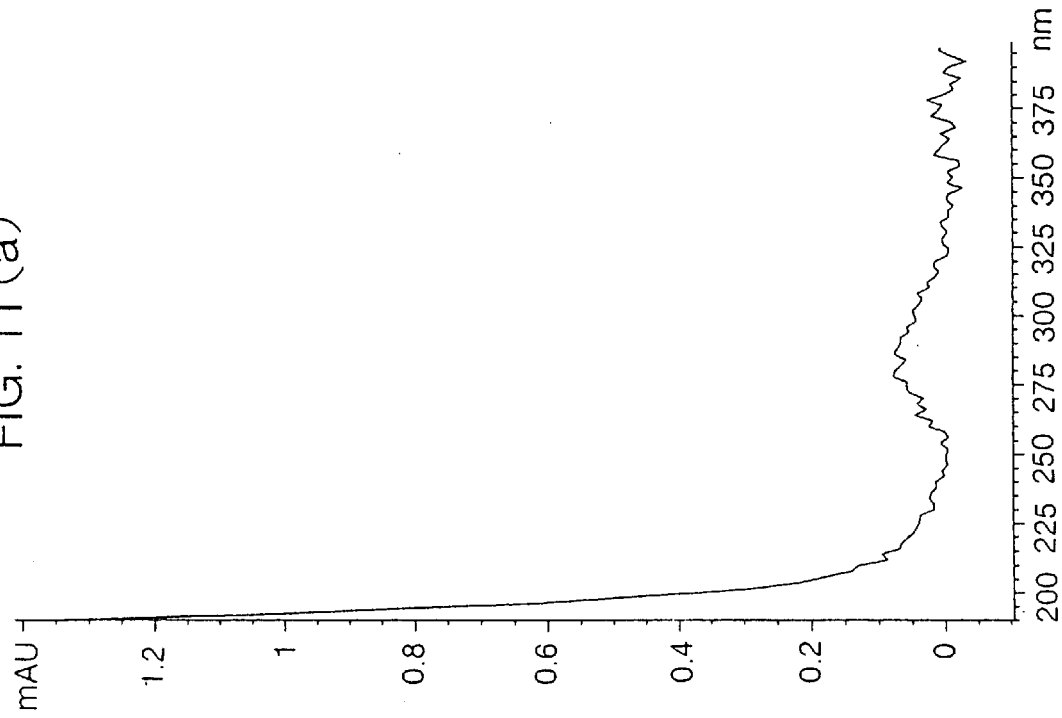

The spectra shown in FIGS. 11(a) and 11(b) have respective patterns that are entirely different from the spectrums of n-butyl aldehyde and the impurity or the partially decomposed product of n-butyl aldehyde shown in FIGS. 10(a) and 10(b). The comparison, therefore, reveals that the substances represented by the peaks (I), (J) are entirely different from n-butyl aldehyde and the impurity or the partially decomposed product of n-butyl aldehyde, though their positions on the chromatograms are similar.

It is considered that the substances represented by the peaks (I), (J) were produced as a result of a chemical change and decomposition of n-butyl aldehyde and the impurity or the partially decomposed product of n-butyl aldehyde owing to the hydroxyl radicals contained in the electrolyzed water obtained from the chamber 3.

In this embodiment, electrolyzed water containing hydroxyl radicals which is obtained from the chamber 3 which serves as the anode side in the second electrolyzing stage is added to water containing an organic substance such as p-tertiary butyl phenol, bisphenol A, n-butyl aldehyde, or decomposed products thereof. However, raw water prepared by adding a chloride such as sodium chloride or potassium chloride to water containing such an organic substance may be directly supplied to the chamber 3. According to such a modification, since hydroxyl radicals produced in the chamber 3 which serves as the anode side in the second electrolyzing stage attack to the organic substance in the raw water and decompose the organic substance, it is possible to remove the water in which the organic substance has been decomposed from the chamber 3.

The method according to present embodiment may be carried out by not only the equipment shown in FIG. 1, but any equipment insofar as it is capable of electrolyzing raw water containing an electrolyte at a cathode side of a first electrolytic chamber which houses an anode plate and a cathode plate with an ion-permeable membrane interposed therebetween, and thereafter electrolyzing the raw water in a second electrolytic chamber which houses an anode plate and a cathode plate with an ion-permeable membrane interposed therebetween. Other equipment that can be used to carry out the method according to present embodiment may be equipment disclosed in Japanese patent application No. 9-271245.

The equipment shown in FIG. 1 employs a chloride such as sodium chloride or potassium chloride as an electrolyte. However, the electrolyte may be a sulfate such as sodium sulfate ($Na_2SO_4$) or the like.

The method of decomposing an organic substance according to the present invention may be applied to the field of waste water treatment, for example.

Although certain preferred embodiments of the present invention have been shown and described in detail, it should be understood that various changes and modifications may be made therein without departing from the scope of the appended claims.

What is claimed is:

1. A method of decomposing an organic chemical, comprising the steps of:

supplying a first electrolytic chamber which houses an anode plate and a cathode plate with an ion-permeable membrane interposed therebetween, with raw water containing an electrolyte as chloride ions;

electrolyzing the raw water;

electrolyzing only electrolyzed water obtained at a cathode side in said first electrolytic chamber, at an anode side in a second electrolytic chamber which houses an anode plate and a cathode plate with an ion-permeable membrane interposed therebetween for thereby generating hydroxyl radicals in the electrolyzed water, wherein hydroxyl radicals exist in the electrolyzed water at least three hours after the electrolysis;

adding the electrolyzed water containing the hydroxyl radicals to water containing an organic chemical to cause the hydroxyl radicals to attack to the organic chemical for thereby decomposing the organic chemical.

2. A method according to claim 1, wherein said organic chemical comprises an aromatic compound.

3. A method according to claim 2, wherein said aromatic compound comprises a phenol.

4. A method according to claim 3, wherein said phenol comprises p-tertiary butyl phenol or bisphenol A.

5. A method according to claim 1, wherein said organic chemical comprises an aliphatic compound.

6. A method of decomposing an organic chemical, comprising the steps of:

preparing raw water by adding an electrolyte as chloride ions to water containing an organic chemical;

supplying the raw water to a first electrolytic chamber which houses an anode plate and a cathode plate with an ion-permeable membrane interposed therebetween;

electrolyzing the raw water;

electrolyzing only electrolyzed water obtained at a cathode side in said first electrolytic chamber, at an anode side in a second electrolytic chamber which houses an anode plate and a cathode plate with an ion-permeable membrane interposed therebetween, for thereby generating hydroxyl radicals in the electrolyzed water; and causing the hydroxyl radicals to attack to the organic chemical contained in the raw water for hereby decomposing the organic chemical.

7. A method according to claim 6, wherein said organic chemical comprises an aromatic compound.

8. A method according to claim 7, wherein said aromatic compound comprises a phenol.

9. A method according to claim 8, wherein said phenol comprises p-tertiary butyl phenol or bisphenol A.

10. A method according to claim 6, wherein said organic chemical comprises an aliphatic compound.

* * * * *